United States Patent [19]

Tachibana

[11] Patent Number: 5,052,788
[45] Date of Patent: Oct. 1, 1991

[54] MICROSCOPE

[76] Inventor: Yoshiaki Tachibana, 26-10 Ikenohata 4-chome, Taito-ku, Tokyo, Japan, 110

[21] Appl. No.: 527,877
[22] Filed: May 24, 1990
[51] Int. Cl.$^5$ .................. G02B 21/00; G02B 23/00
[52] U.S. Cl. .................. 359/391; 359/368; 359/399
[58] Field of Search ........... 350/507, 508, 520, 522, 350/527–529, 537, 538, 543, 544, 563, 577

[56] References Cited
FOREIGN PATENT DOCUMENTS
2217471 10/1989 United Kingdom ............ 350/529

Primary Examiner—Bruce Y. Arnold
Assistant Examiner—Thong Nguyen
Attorney, Agent, or Firm—Fleit, Jacobson, Cohn, Price, Holman & Stren

[57] ABSTRACT

A microscope telescope comprises a base, (3) an arm (1) rotatably attached to the base, a microscope barrel (49) attached to the arm, an objective-holding tube (55) and a telescope tube, (65) removably attachable to the microscope barrel for alternative use. The instrument functions as a microscope by attaching the objective-holding tube to the microscope barrel and also functions as a telescope, when desired, by attaching the telescope tube to the microscope barrel, from which the objective-holding tube is removed, and by rotating the arm at a desired angle with respect to the base.

9 Claims, 7 Drawing Sheets

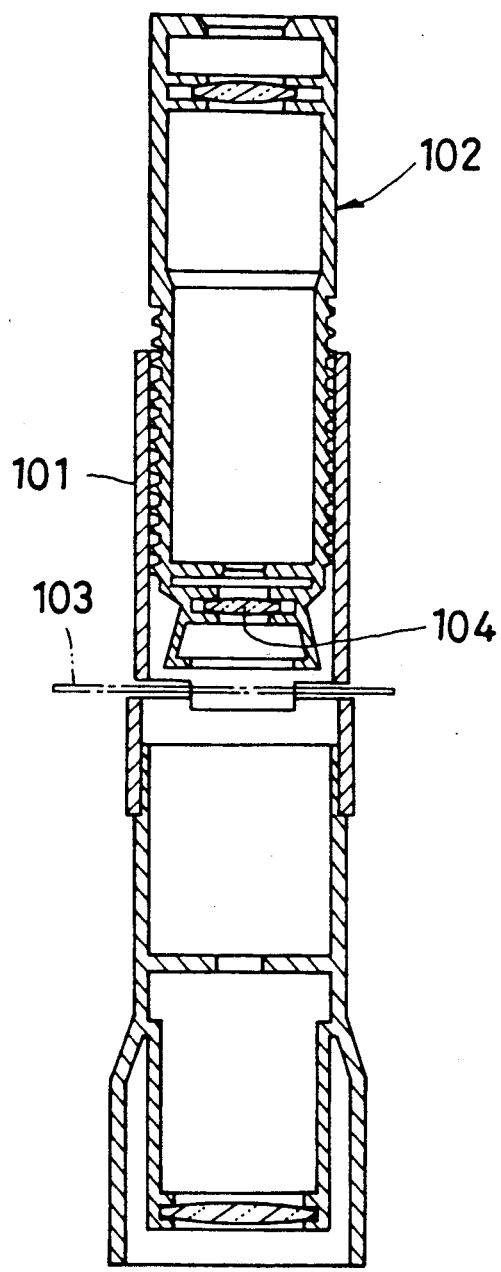

MICROSCOPE

BACKGROUND OF THE INVENTION

1. Field of the Invention

The present invention relates to a microscope, more particularly to a microscope which also functions as a telescope after the replacement of appropriate parts.

2. Description of the Prior Art

Conventional microscopes are generally constructed follows: with a base, on which an arm stands a microscope barrel over the arm and a stage somewhat below the microscope barrel.

The purpose is to hold a prepared slide holding a specimen on the stage, allowing observation of the specimen through the microscope barrel at a desired magnification.

Such conventional microscopes as the above have the problem of carrying out only the functions associated with a microscope and do not have the functions associated with a telescope, which is also an instrument utilized to look at things under magnification.

Microscopes having both microscope and telescope functions have been proposed to solve the above problem. As shown in FIG. 10, this type of microscope with telescopic functions is constructed with a telescope tube 101 and a microscope tube 102 which is slidably attached to the telescope tube 101. A prepared slide 103 holding a specimen is removably attached under the telescope tube 101 which is slidably attached to the microscope tube 102.

According to the above-described construction, there are disadvantages in that the microscope functions are remarkably restricted when the microscope with telescopic functions is utilized as a microscope. More specifically, a specimen cannot be observed in a wide range of magnification due to a fixed objective 104. Further, when the microscope with telescopic functions is utilized as a microscope, the required light collected is sufficient for use with a low-powered lens, but is insufficient for use with a high-powered lens. This is because part of the telescope tube 101 is made of a transparent member. Moreover, since the microscope tube 102 is installed so as to tilt with respect to the telescope tube 101, which serves as a base when the microscope with telescopic functions is utilized as a microscope, the microscope with telescopic functions is not adequate for observation at high magnification, because high magnification demands delicate focusing. The microscope with telescopic functions further provides awkward handling when utilized on a desk.

SUMMARY OF THE INVENTION

In light of the above-mentioned problems, it is an object of the present invention to provide a microscope which functions not only as a microscope to the fullest extent but also as a telescope to the fullest extent after replacement of proper parts, without restricting any of the inherent functions of either a microscope or a telescope.

The invention achieves this object by providing a microscope having a base, an arm rotatably attached to the base, a microscope barrel attached to the arm, an objective-holding tube and a telescope tube, both the objective-holding tube and the telescope tube being removably attached to the microscope barrel, wherein an eyepiece is attached to one end of the microscope barrel and the objective-holding tube is removably attached to the other end of the microscope barrel while holding an objective lens (hereafter referred to as objective), and wherein the telescope tube has at least an objective and can be removably attached to the microscope barrel in a direction in which the microscope barrel extends after the objective-holding tube is removed from the microscope barrel.

The arm is rotatably attached to the base and is tilted slightly from normal with the base when the instrument is utilized as a microscope. At this time, the objective-holding tube for holding an objective is attached to a microscope barrel which is fixed to the arm.

Further, when the instrument is utilized as a telescope, the objective-holding tube attached to the microscope barrel, with its objective, is removed, and then the microscope barrel is replaced with a telescope tube. At this time, the arm is rotated by a desired amount of rotation (e.g., the arm may be rotated so as to become substantially horizontal) with respect to the base, thus allowing the instrument to be utilized as a telescope.

Such an instrument as described above has an arc formed at the lowermost end of the arm as well as a press plate, having a press portion which slides on the arc, which is integrated into the base. This arrangement makes it possible to adjust tilt angles of the arm to the base.

The telescope tube comprises an outer tube having the objective at its end, an inner tube having not only a pair of reflectors which are slidably housed at the base of the outer tube but also a radially projected retaining portion, and further comprises an adjustment which is arranged so as to oppose the microscope barrel at the base of the outer tube, and which has cam faces in the internal circumference so as to slide the inner tube by the retaining portion in the inner tube, the retaining portion being energized by the rotation of the cams.

Magnification adjustment can be made by sliding the inner tube by means of the rotation of the adjustment.

The outer tube has a convexity or a concavity in the external circumference, and the rotation of the outer tube is restricted by said convexity or concavity being engaged with a concavity or a convexity formed in the arm.

The above construction is for restricting the rotation of the telescope tube. The rotation of the telescope tube is thus restricted by bringing the convexity or the concavity formed on the periphery of the outer tube into contact with the complementary concavity or the convexity formed on the arm.

BRIEF DESCRIPTION OF THE DRAWINGS

Other features and advantages of the present invention will become apparent from the following description of the preferred embodiment when read with reference to the accompanying drawings wherein:

FIG. 10 is an explanatory cross-sectional view illustrating a conventional microscope with telescopic functions.

DESCRIPTION OF THE PREFERRED EMBODIMENT

An embodiment of the present invention will now be described with reference to FIGS. 1 to 9.

Figure 1:
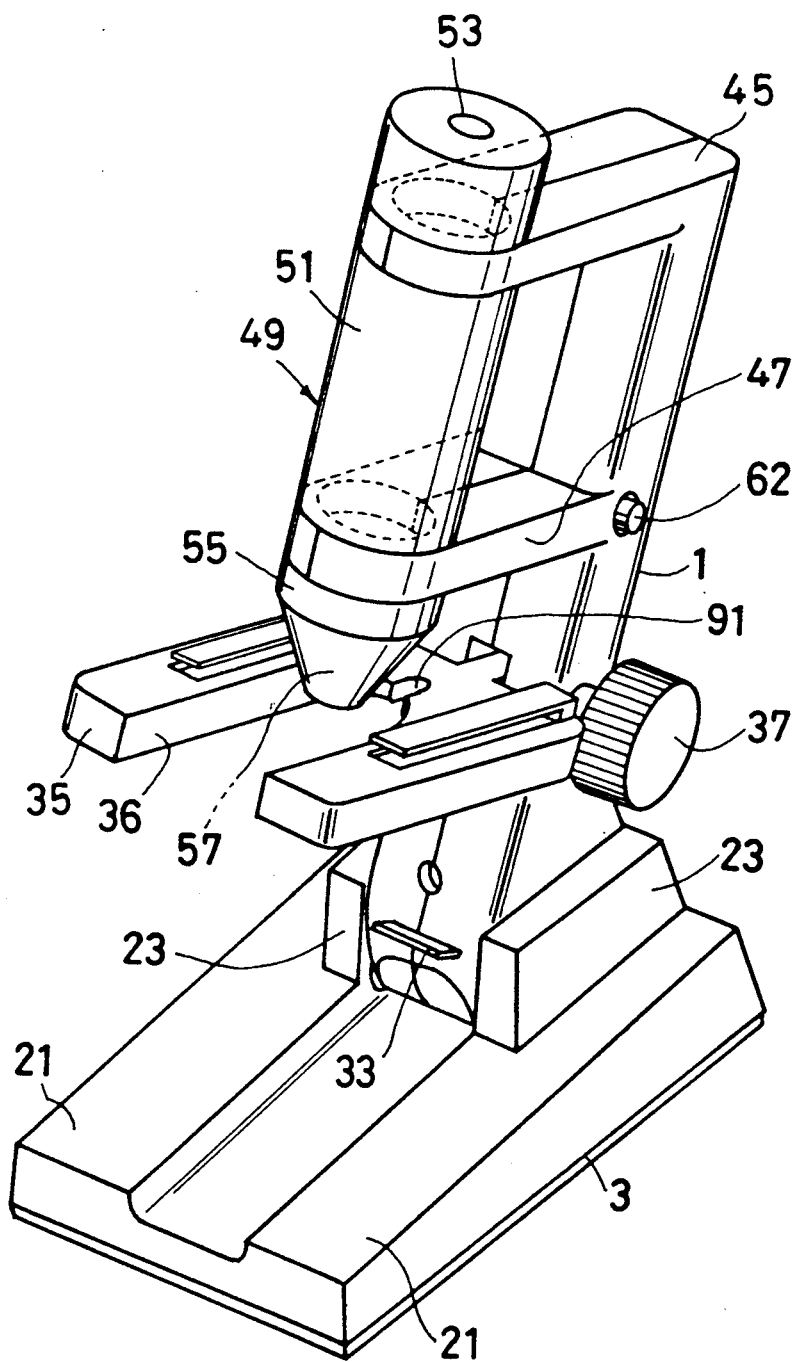
FIG. 1 is a perspective view showing an instrument according to the present invention.
Figure 2:
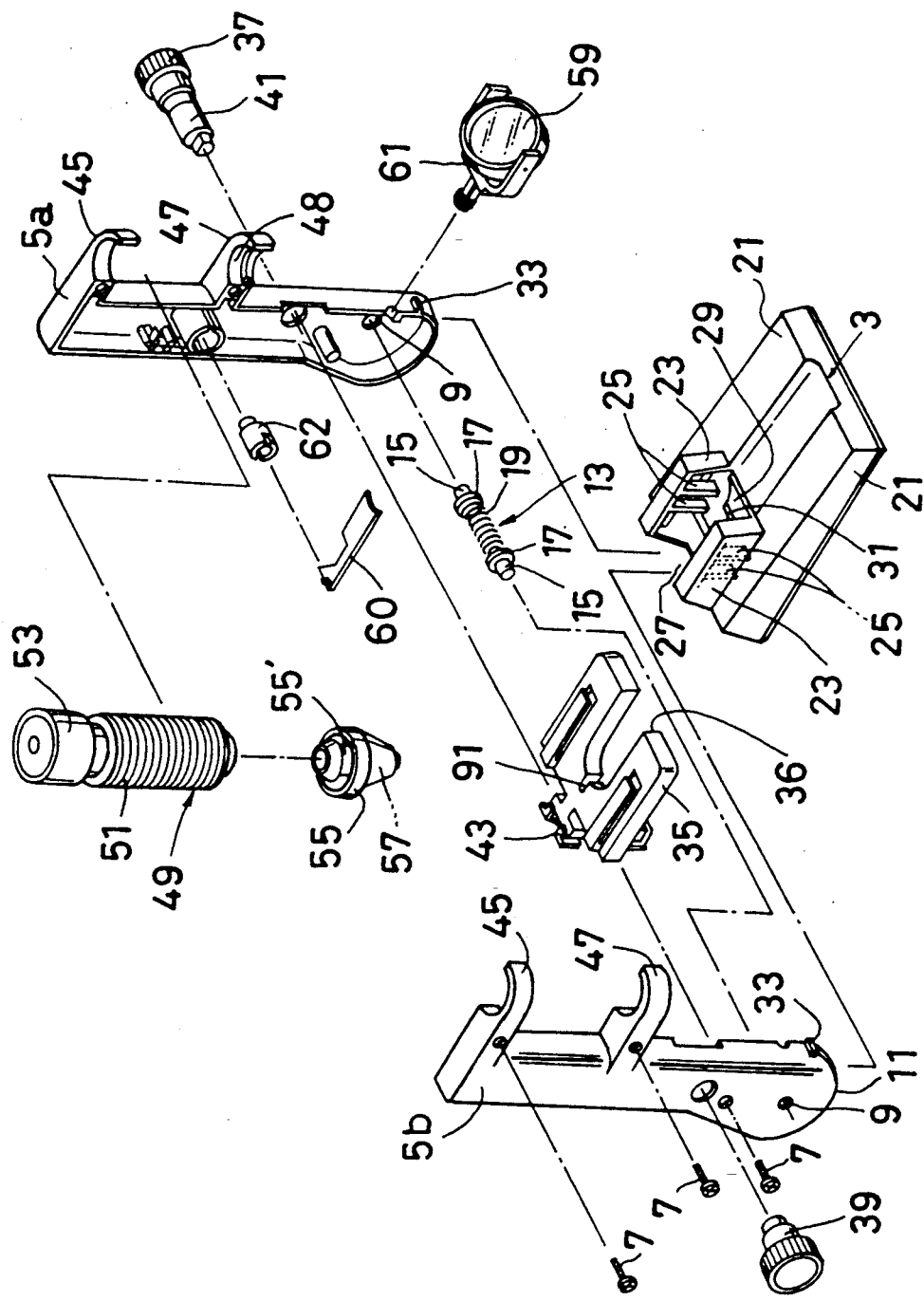
FIG. 2 is an exploded perspective view showing the instrument in FIG. 1.

FIG. 1 is a perspective view showing the entire construction of an instrument according to the present invention and FIG. 2 is an exploded perspective view showing the instrument in FIG. 1.

As shown in FIGS. 1 and 2, numeral 1 denotes an arm which is rotatably attached to a base 3 made of plastic, and which is fixed with a screw 7 by facing each other a pair of side plates 5a, 5b made of plastic. Piercing holes are formed at the lower center of the side plates 5a, 5b. The lower faces of the side plates 5a, 5b are formed so as to form an arc at a fixed radius centered on the piercing holes 9 (an arc portion 11).

A support 13 is provided at the position of the piercing holes 9. The support 13 includes a shaft 15 having a pair of brims 17 at both ends and a spring 19. When the above-constructed support 13 is attached to the side plates 5a, 5b, the ends of the shaft 15 protrude slightly from the piercing holes 9 by reaction of the spring 19.

A covering plate 21, having projected arm-supporting portions 23 at one end, is vertically provided on the base 3. The arm 1 is rotatably supported in the recess formed by the arm-supporting portions 23.

More specifically, a pair of fastening walls 25, having a width sufficient to fix one end of the shaft 15, are provided on the inside of one arm-supporting portion 23, and a pair of fastening walls 25, having a width sufficient to fix the other end of the shaft 15, are provided on the inside of the other portion 23. An inserting portion 27, into which the lowermost portion of the arm 1 is inserted, is formed at one end of the base 3.

Figure 3:
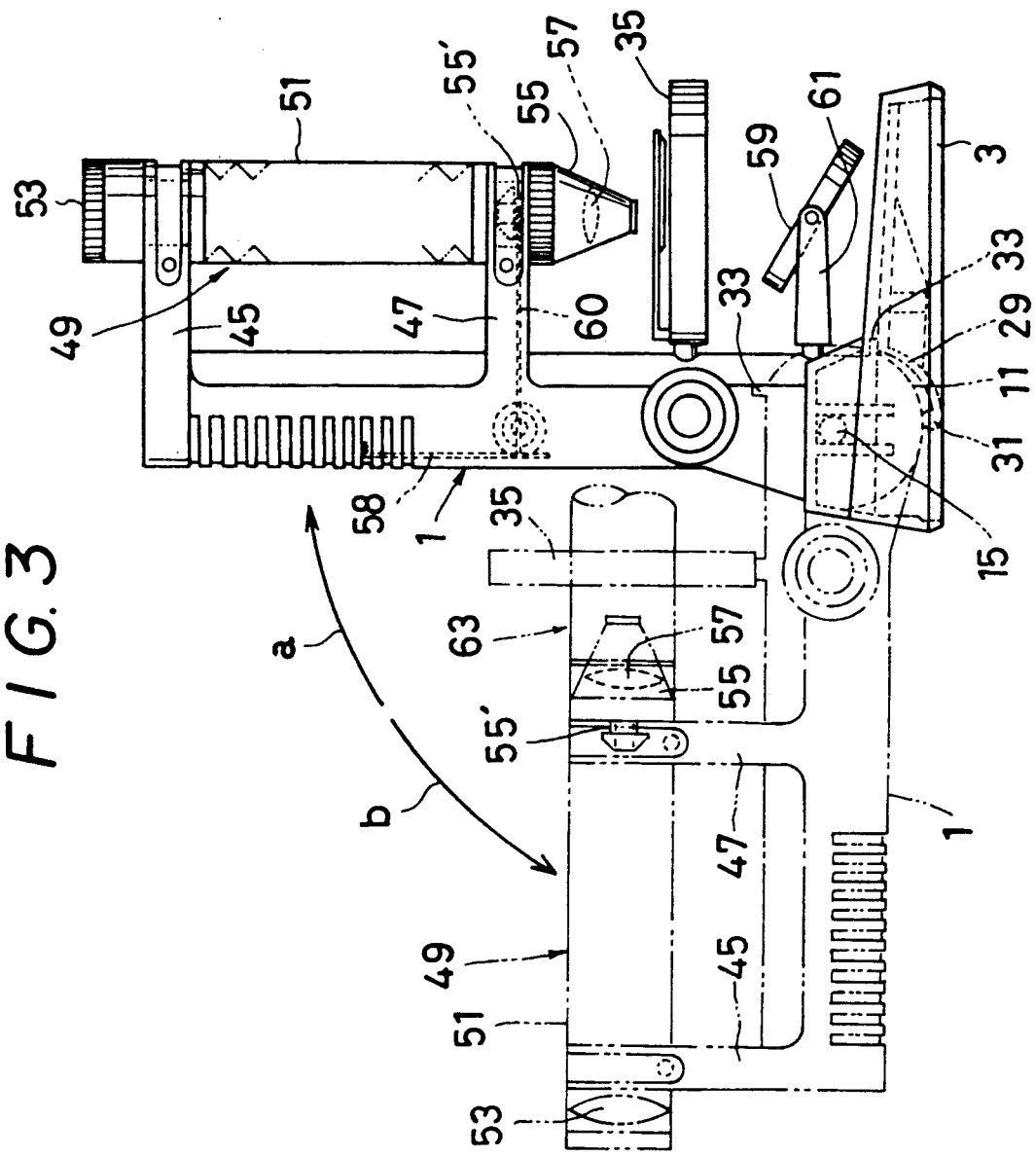
FIG. 3 is a side view showing rotative motion of the instrument.
Figure 4:
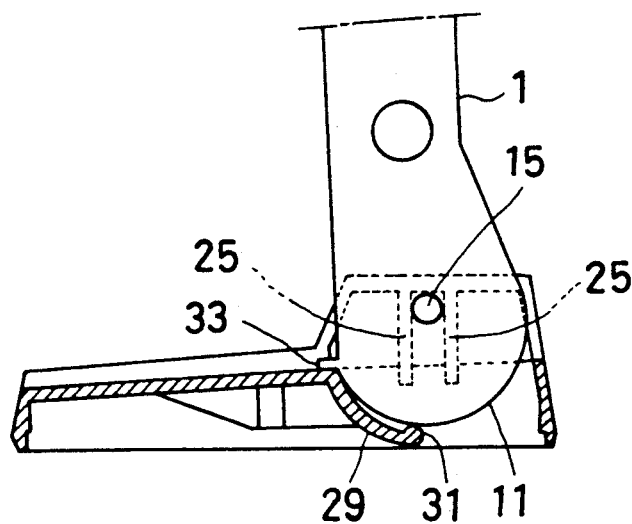
FIG. 4 is a cross-sectional view of the instrument illustrating the structure of a rotation fulcrum associated with the arm.

A pressure plate 29, having a projected pressing portion 31 arranged at its front end, is interposed between the arm-supporting portions 23 so as to become integrated into the base 3. As shown in FIGS. 3 and 4, the arm 1 rotates while its arc portion 11 slidingly contacts the pressing portion 31 at the front end of the pressure plate 29. Further, a stopper 33 is provided on the arc portion 11 and restricts, by this stopper 33 being brought into contact of the surface of the base 3, the amount of rotation with the arm 1 in the direction indicated by arrow a in FIG. 3 (the arm 1 rotates until it becomes normal to the base 3). The arm 1 rotates in the direction indicated by arrow b until it becomes substantially horizontal. Furthermore, since the arc portion 11 is always pressed by pressing portion 31, the arm 1 can rest at a given angle to select at will any tilt angle with respect to the base 3.

A stage 35 is slidably attached to the arm 1. More specifically, as shown in FIG. 2, a rotating knob 37 is arranged at the back of the stage 35 and runs through the side wall 5a so as to fit into a retaining shaft 39 which is arranged through the side wall 5b. A surrounding portion 41 made of an elastic material with high friction coefficient is fixed to the rotating knob 37. A contact plate 43 is attached to the back of the stage 35. The rotation of the rotating knob 37 makes the stage 35 shift upward and downward with the aid of the surrounding portion 41 and the contact plate 43. The stage 35 has notch 36 in the middle of the front.

Holding arms 45, 47, to which a microscope barrel 49 is attached, are attached to the arm 1. The microscope barrel 49 comprises a tube 51, an eyepiece 53 attached at one end of the tube 51 and an objective-holding tube 55 attached at the other end of the tube 51 for holding an objective 57. The objective-holding tube 55 is removably attached to the tube 51, while holding the objective 57.

Figure 5:
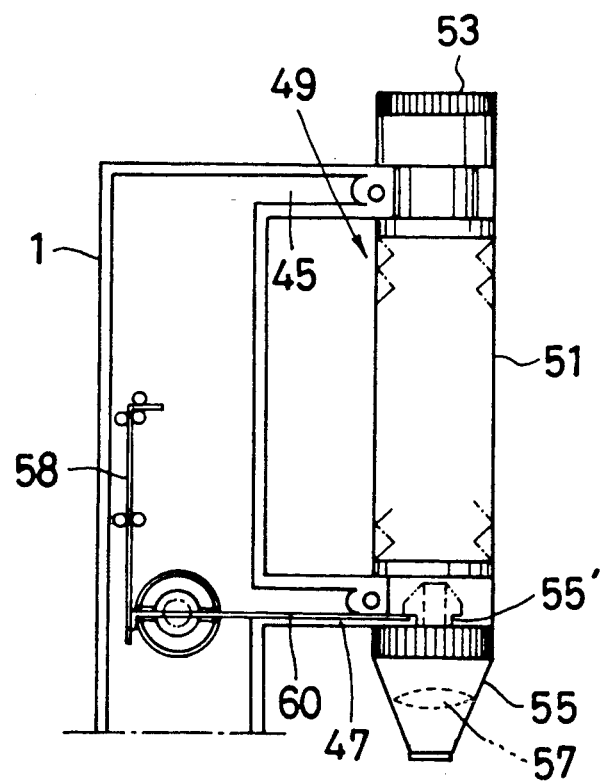
FIG. 5 is a partial side view of the instrument illustrating the relation between the fulcrum and the microscope barrel.

The attachment and removal of the objective-holding tube 55 will be further detailed. The objective-holding tube 55 is positioned at a hole 48 formed by holding arms 47. As shown in FIGS. 3 and 5, the objective-holding tube 55 is supported by the tip of an operation plate 60 which is resiliently urged by a built-in leaf spring 58 inside the arm 1 and fitted into a fitting groove 55' in the central part of objective-holding tube 55, through which hole 55 extends. Under this condition, pressing a pushbutton 62 causes the operation plate 60 to lower its position against the spring force exerted by the leaf spring 58, thereby releasing the operation plate 60 from the objective-holding tube 55.

Below stage 35, a reflector 59 is rotatably attached with the aid of a holding frame 61 to the arm 1. FIG. 5 is a view in which the arm 1 and the microscope barrel 49 are selectively and partially shown.

The above description is for the components of the instrument when it is utilized as a microscope. The components of the instrument when it is utilized as a telescope will now be described.

Figure 6:
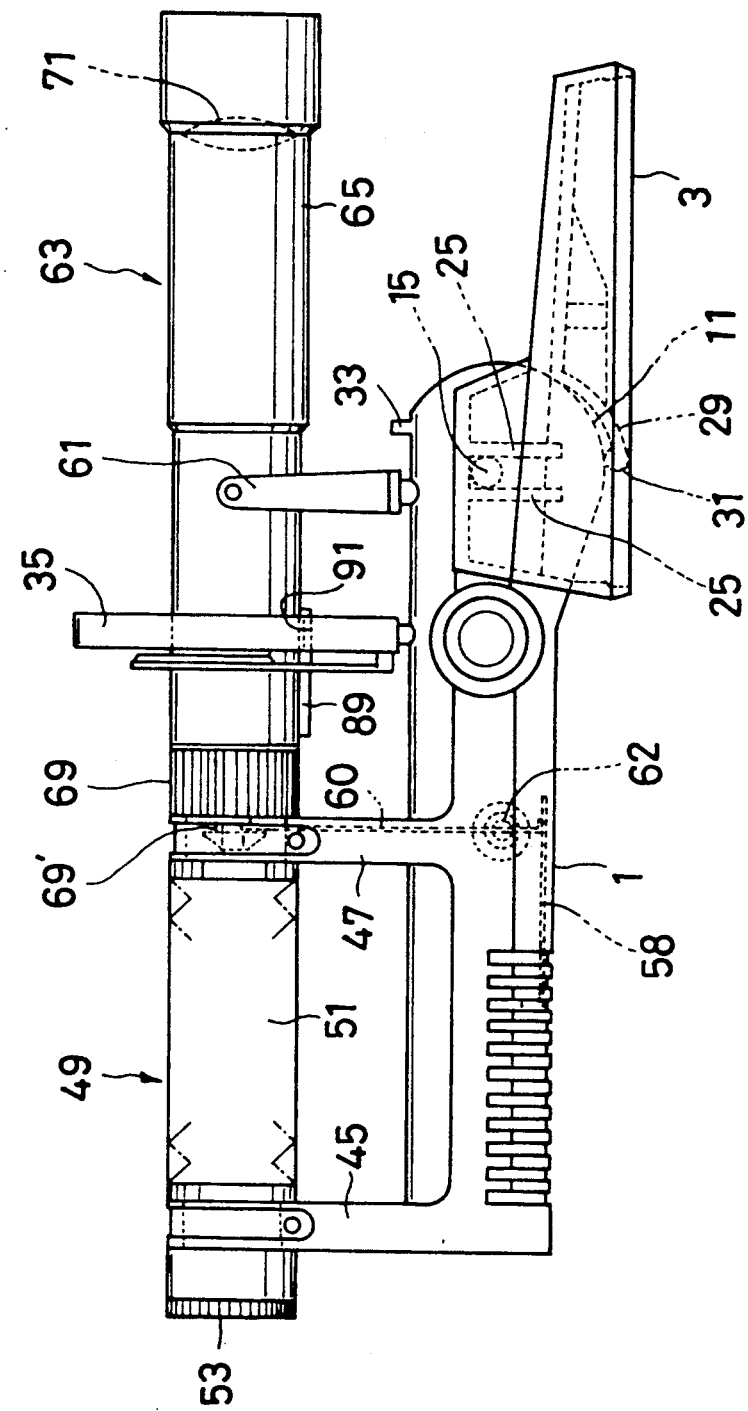
FIG. 6 is a side view of the instrument when it is utilized as a telescope.

As shown in FIG. 6, the instrument can be utilized as a telescope when a telescope tube 63 is attached after the arm 1 is rotated until it becomes substantially horizontal. At this time, the telescope tube 63 is maintained by the fact that the tip of the operation plate 60 which is energized by the built-in leaf spring 58 inside the arm 1 is fitted into a fitting groove 69' in an adjustment member 69 attached to the front end of the telescope tube 63.

Figure 7:
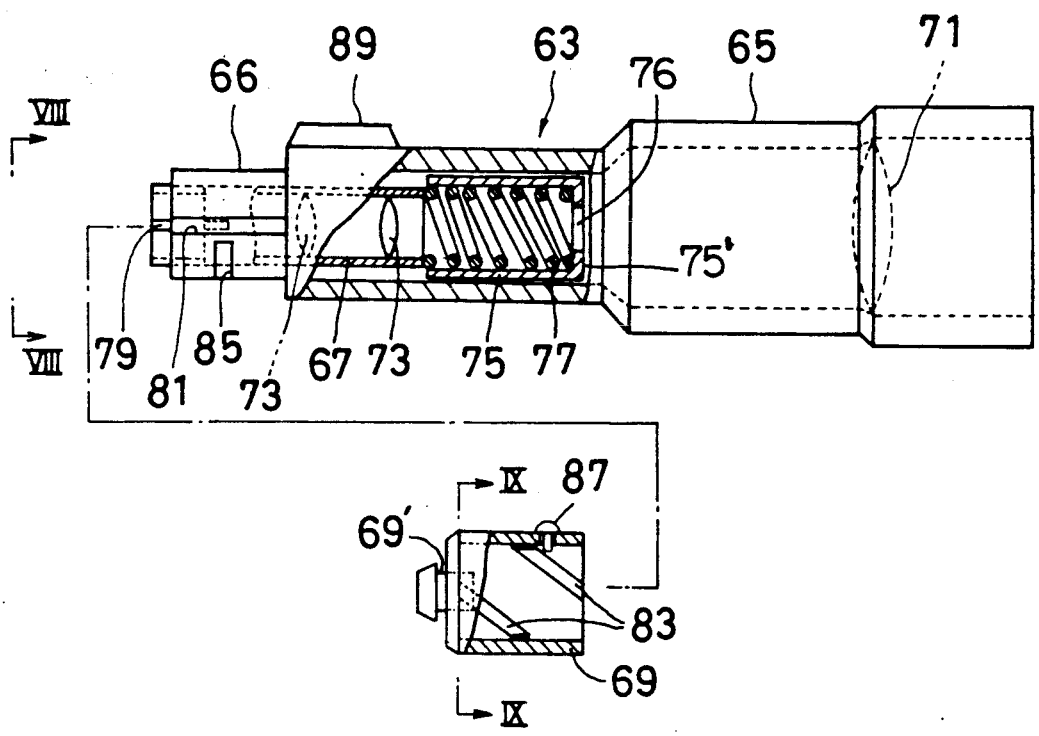
FIG. 7 is a partial cross-sectional view showing a telescope tube.

As shown in FIG. 7, the telescope tube 63 comprises an outer tube 65, an inner tube 67 which is slidably attached to the inside of base 66 of the outer tube 65, and adjustment member 69 rotatably mounted on base 66 of the outer tube 65.

An objective 71 is attached to the end of the outer tube 65 and a pair of reflectors 73 are attached inside the inner tube 67. The inner tube 67 is resiliently urged by a spring 77, which is housed in a box 75 of the outer tube 65, so as to protrude from the outer tube 65. Box 75 has a flanged spring engaging inner end 75' forming hole 76 through this end.

Figure 8:
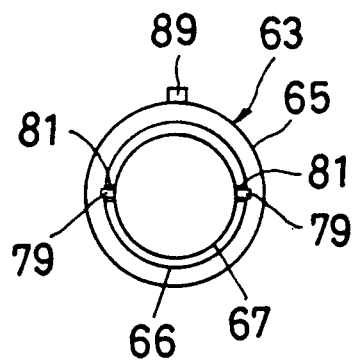
FIG. 8 is a view taken from line VIII—VIII of FIG. 7.

As shown in FIG. 8, a pair of retaining portions 79 are disposed at an angle of 180° on the periphery wall of the inner tube 67 so as to therefrom. The outer tube 65 has small diameter base 66 in which a pair of grooves 81 are axially formed at an angle of 180° to permit the retaining portions 79 to travel axially therein.

Figure 9:
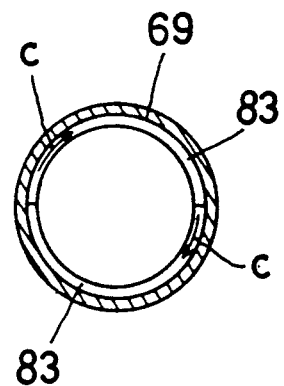
FIG. 9 is a cross-sectional view taken line IX—IX of FIG. 7.

As has been described, the adjustment member 69 is to the rotatably mounted on base 66 of the outer tube 65. As shown in FIGS. 7 to 9, the member 69 has a pair of cams 83 helically formed on the internal circumferential surface thereof so as to engage with and urge the retaining portions 79 upon rotation of adjustment member 69. The cams 83 are arranged so as to gradually lower their positions in the direction, for example, indicated by arrow c in FIG. 9.

Rotation of the adjustment member 69 in a one direction causes the retaining portions 79 to travel axially by contacting the cam faces 83 by the reaction of the spring 77, thereby sliding inner tube 67 axially in the direction toward objective 71 against the force of spring 77. Rotation of member 69 in the opposite direction produces axial adjustment of inner tube 67 in the opposite direction away from objective 71 by the force of spring 77.

Moreover, as shown in FIG. 7, a groove 85 is formed in the circumference of the base 66 of the outer tube 65. The tip of a screw 87, which fixes the adjustment member 69 to the base 66, engages with the groove 85. The amount of rotation of the adjustment 69 is restricted by the tip of the screw 87 being engaged with the ends of the groove 85 in the circumference.

A projected retaining portion 89 is arranged on the outer tube 65, while a concavity 91 is, as shown in FIGS. 1, 2 and 6, formed on the stage 35. The engagement of the retaining portion 89 with the concavity 91 regulates, or prevents, rotation of the telescope tube 63.

The operation of the instrument will be described based on the above-mentioned components.

Firstly, when the instrument is utilized as a microscope, set up the instrument as shown in FIG. 1 and observe a specimen by placing a prepared slide (not shown) holding the specimen onto the stage 35.

Secondly, when the instrument is utilized as a telescope, remove the objective-holding tube 55 from the microscope barrel. Attach the telescope tube 63 after the arm 1 is rotated as shown in FIG. 6, and observe an object by rotating the adjustment 69 to a desired magnification.

A microscope according to this embodiment offers the following advantages.

The instrument can be utilized not only as a microscope but also as a telescope. This is possible for the following two reasons: first, the arm 1 is rotatably attached to the base 3, which permits the arm 1 to rotate until it becomes substantially horizontal, second, the instrument is so constructed that the telescope tube 63 can be attached after removing the objective-holding tube 55 from the microscope barrel 49.

When the instrument is utilized as a microscope, the rotation of the adjustment member 69 makes it possible for the inner tube 67, which has a pair of reflectors 73, to slide until the desired magnification is obtained.

No trouble occurs by rotation of telescope tube 63 during adjustment by adjustment member 69, since the rotation of the telescope tube 63 is regulated, or prevented, by the engagement of the retaining portion 89 with the concavity 91.

There is no risk of excessive rotation of the adjustment 69, because the rotation of the adjustment 69 is restricted by the screw 87 being engaged with the ends of the groove 85.

Furthermore, because the reflectors 73 are arranged between the objective 71 and the eyepiece 53, an observer is able to see a correct image of a specimen.

As has been described in detail, according to the present invention, a microscope can be utilized not only as a microscope but also as a telescope after replacement of proper parts. When the instrument is utilized as a microscope, it provides the microscope functions to the fullest extent, and when utilized as a telescope, it enhances the telescope functions owing to the fact that the arm is rotatably attached.

In addition, the rotation of the adjustment member associated with the telescope tube makes it possible to adjust magnification. Moreover, no trouble exists during adjustment of the magnification, since the rotation of the telescope tube is restricted.

The invention has been described in detail with particular reference to the preferred embodiment thereof, but it will be understood that variations and modifications of the invention can be made within the spirit and scope of the invention.

I claim:

1. A microscope-telescope instrument comprising:
   a base;
   an arm rotatably mounted on said base;
   a microscope barrel attached to said arm;
   an eyepiece attached to one end of said microscope barrel;
   a microscope objective-holding tube removably attachable to the other end of said microscope barrel;
   an objective in said objective-holding tube;
   a telescope tube removably attachable to said other end of said microscope barrel interchangeably with said objective-holding tube;
   an objective in said telescope tube; and
   cooperating attachment means on said arm, objective-holding tube and telescope tube for removably attaching said objective-holding tube and said telescope tube interchangeably to said other end of said microscope barrel, so that the instrument is usable alternatively as a microscope when said objective-holding tube is attached and as a telescope when said objective-holding tube is removed and said telescope tube is attached in place thereof and vice-versa.

2. A microscope-telescope instrument comprising:
   a base;
   an arm rotatably mounted on said base;
   a microscope barrel attached to said arm;
   an arc shaped lower end on said arm;
   a pressure plate integral with said base adjacent said arc shaped lower end of said arm;
   a pressing part on said pressure plate in sliding pressing engagement with said arc shaped lower end for allowing rotation of said arm and releasably retaining said arm in any position of rotation thereof;
   an eyepiece attached to one end of said microscope barrel;
   a microscope objective-holding tube removably attachable to the other end of said microscope barrel;
   an objective in said objective-holding tube;
   a telescope tube removably attachable to said other end of said microscope barrel interchangeably with said objective-holding tube;
   an objective in said telescope tube; and
   cooperating attachment means on said arm, objective-holding tube and telescope tube for removably attaching said objective-holding tube and said telescope tube interchangeably to said other end of said microscope barrel, so that the instrument is usable alternatively as a microscope when said objective-holding tube is attached and as a telescope when said objective-holding tube is removed and said telescope tube is attached in place thereof and vice-versa.

3. A microscope-telescope instrument comprising:
   a base;

an arm rotatably mounted on said base;
a microscope barrel attached to said arm;
an eyepiece attached to one end of said microscope barrel;
a microscope objective-holding tube removably attachable to the other end of said microscope barrel;
an objective in said objective-holding tube;
a telescope tube removably attachable to said other end of said microscope barrel interchangeably with said objective-holding tube; and
cooperating attachment means on said arm, objective-holding tube and telescope tube for removably attaching said objective-holding tube and said telescope tube interchangeably to said other end of said microscope barrel, so that the instrument is usable alternatively as a microscope when said objective-holding tube is attached and as a telescope when said objective-holding tube is removed and said telescope tube is attached in place thereof and vice-versa;
said telescope tube comprising,
an outer tube,
an objective in and adjacent one end of said outer tube,
a base at the other end of said outer tube,
an inner tube slidably mounted in said base,
a pair of reflectors mounted in said inner tube,
retaining slots in said base,
retaining members projecting radially outwardly from said inner tube and engaging in said retaining slots for guiding said inner tube during axial adjustment thereof,
an adjustment member rotatably mounted on said base and having an internal circumferential surface, and
cam members on said internal circumferential surface having cam faces engageable with said retaining members so that rotation of said adjustment member slidably engages said cam faces with said retaining members to move said inner tube and adjust said inner tube axially relative to said outer tube.

4. A microscope-telescope instrument as claimed in claim 3 and further comprising:
cooperating interengaging guide means on said arm and on said outer tube for restricting rotation of said outer tube relative to said arm.

5. A microscope-telescope instrument as claimed in claim 4 wherein said interengaging guide means comprises:
a concavity in said arm; and
a convexity on said outer tube.

6. A microscope-telescope instrument as claimed in claim 4 wherein said interengaging guide means comprises:
a convexity in said arm; and
a concavity on said outer tube.

7. A microscope-telescope instrument as claimed in claim 3 and further comprising:
spring means in said outer tube resiliently urging said inner tube axially for engaging said retaining members against said cam faces.

8. A microscope-telescope instrument as claimed in claim 4 and further comprising:
spring means in said outer tube resiliently urging said inner tube axially for engaging said retaining members against said cam faces.

9. A microscope-telescope instrument as claimed in claim 5 and further comprising:
spring means in said outer tube resiliently urging said inner tube axially for engaging said retaining members against said cam faces.

* * * * *